July 23, 1957  B. C. D'EYE FARRINGTON ET AL  2,800,339
CONTROL DEVICE TO PREVENT BRAKE MECHANISM FROM
INTERFERING WITH COUPLING OF
TRACTOR AND SEMI-TRAILER
Filed July 25, 1955  2 Sheets-Sheet 1
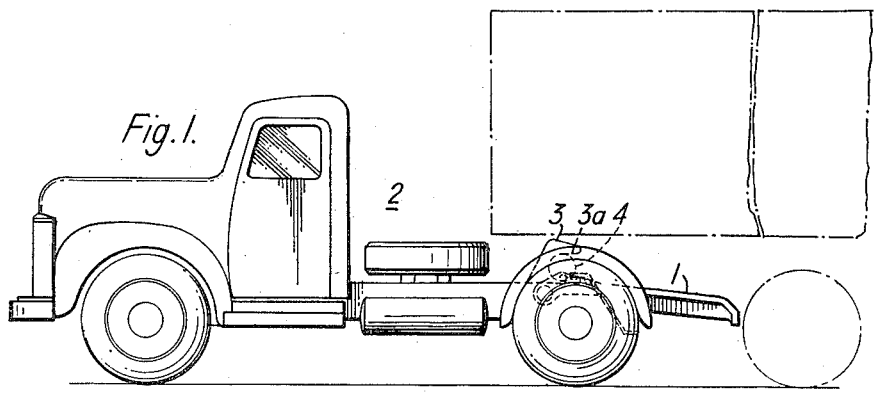
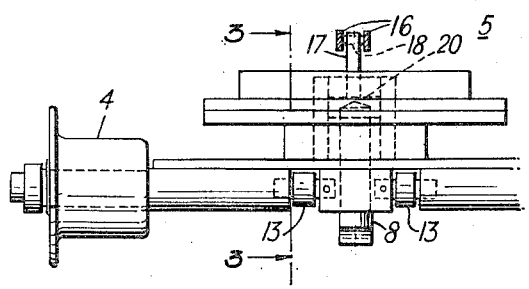
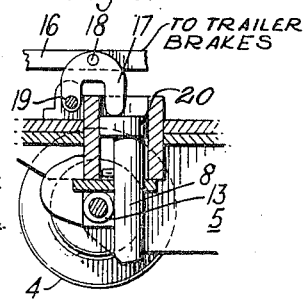
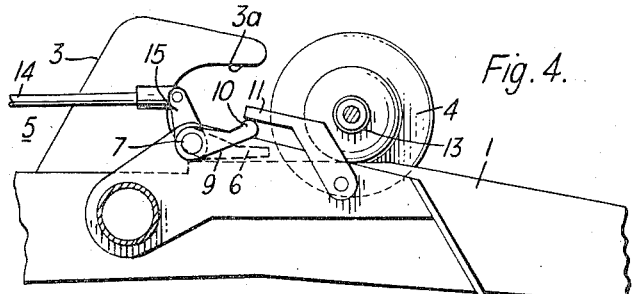
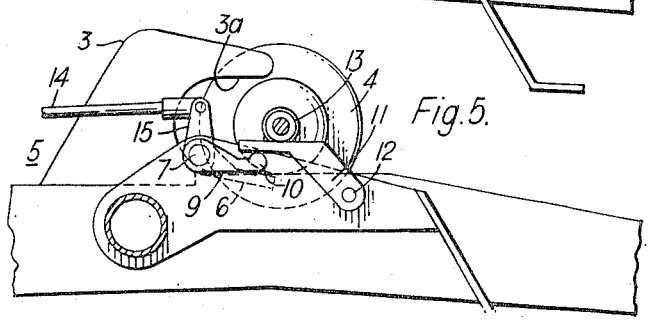
Inventors
BERNERS CHARLES D'EYE FARRINGTON and HOWARD GEORGE HANDS
BY Larson & Whiting Attorneys

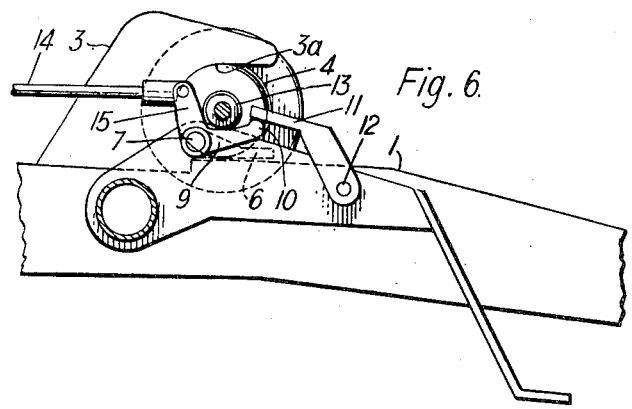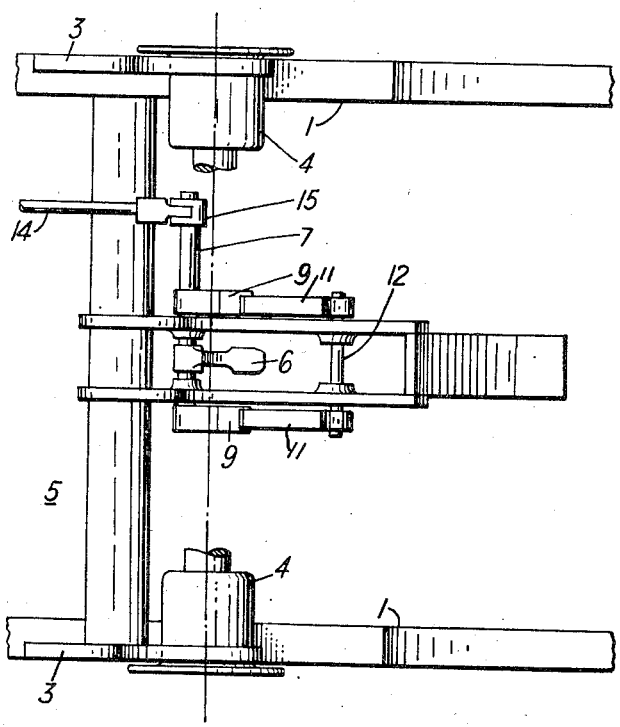

United States Patent Office 2,800,339
Patented July 23, 1957

2,800,339

CONTROL DEVICE TO PREVENT BRAKE MECHANISM FROM INTERFERING WITH COUPLING OF TRACTOR AND SEMI-TRAILER

Berners Charles D'Eye Farrington and Howard George Hands, Letchworth, England

Application July 25, 1955, Serial No. 524,207

Claims priority, application Great Britain July 27, 1954

6 Claims. (Cl. 280—420)

This invention relates to the brake mechanisms of tractors and semi-trailers. In such composite vehicles a trailer has a pair of road-wheels towards the rear of its chassis and a collapsible forecarriage having relatively small diameter flanged ramp rollers which are adapted to run on weight-carrying ramps at the rear of the tractor. When properly coupled to the tractor the forward end of the trailer is wholly supported by these rollers on the said ramps of the tractor by which it is towed. Suitable locking devices are provided for coupling the trailer to the tractor for towing purposes, these devices being releasable to permit separation of the trailer from the tractor. The semi-trailer brakes are operated from the tractor through a separable linkage.

It is an object of the present invention to provide an improved arrangement for the automatic engagement of the separable portions of the trailer brake linkage without, on the one hand, permitting fouling of the interengageable parts to prevent full engagement of the coupling whilst, on the other hand, avoiding the necessity of leaving excessive play between the said parts when the trailer is coupled to the tractor.

Accordingly, for a tractor and semi-trailer composite vehicle of the kind (referred to hereinafter as the kind described) in which the brakes on the semi-trailer are applied from the tractor through a pair of coacting displaceable members mounted the one on the tractor and the other on the trailer which interengage when the two components of the composite vehicle are coupled together, the present invention is a means for automatically first deflecting the tractor-mounted member of the coacting pair as the semi-trailer rides up the tractor ramps so that it clears the other displaceable member on the semi-trailer, then releasing it again as the semi-trailer reaches the fully coupled position so that the two displaceable members make working contact with each other. One way of achieving this is to provide an arm locked to the tractor-mounted displaceable member such as a pivoted spade so as to pivot in unison therewith about the same axis, this arm extending forwards on one side of the spade and being operable by a depressor member—such as a roller—on the semi-trailer which holds the arm, and thus also the spade, deflected downwards until the semi-trailer reaches its fully coupled position.

Preferably, the free end of the arm is engaged by the free end of an oppositely extending cam lever freely pivoted on the tractor structure about an axis to the rear of, and parallel to, the pivot axis of the spade.

A practical embodiment of the present invention will now be particularly described, by way of illustration only, and with reference to the accompanying drawings in which:

Figure 1 is a general view of a tractor vehicle;

Figure 2 is a fragmentary front elevation of the forecarriage and brake operating mechanism of a semi-trailer;

Figure 3 is a composite fragmentary sectional view on the lines 3—3 of Figure 2;

Figures 4–6 are scrap views showing the interrelations of tractor and semi-trailer components in three successive stages of the coupling operation; and Figure 7 is a plan view of Figure 6 with parts broken away.

The ramps 1 on the tractor 2 (Figures 1 and 4–7) of a composite tractor and semi-trailer vehicle terminate at their forward ends in upstanding stop brackets 3 which are generally C-shaped in side elevation the bight of the C facing rearwards and being so dimensioned that the ramp rollers 4 on the semi-trailer 5 (Figure 2) engage within the bights 3a of the brackets 3 in the coupled position of the vehicle components. The rollers 4 are then positively retained in contact with the ramps 1 so that bounce due to road surface irregularities during towing is prevented.

The semi-trailer brakes are operated from the tractor 2 through a linkage which includes a generally horizontal actuator lever or spade 6 keyed on a cross-shaft 7 on the tractor 2 and which normally underlies a coacting vertically displaceable plunger 8 (Figs. 2 and 3) on the trailer 5 and is operative to raise this plunger when the brakes are applied, the plunger 8 thus serving to transmit brake applying effort to the semi-trailer brakes. When the semi-trailer 5 is being coupled to the tractor 2, this plunger 8 must pass over the rearward free end of the actuator spade 6, and fouling of these parts prevents proper location of the semi-trailer on the tractor so that it cannot be coupled. To prevent this happening, the spade cross-shaft 7 according to the present invention has keyed thereto a pair of horizontal arms 9, each of approximately the same length as the spade and located one on each side thereof. Each arm 9 terminates on its upper side in a rounded boss 10 (Figs. 4–6) on which rests the forward free end of a short ramp or cam lever 11, both cam levers being pivoted on a common cross-pin 12 (Fig. 7) rearward of the spade tip, the arms 9 and cam levers 11 together constituting deflection transmitting means for transmitting deflecting movement to the spade 6.

The upper surfaces of the cam levers 11 slope down rearwards, and are engageable, during the semi-trailer coupling operation, by deflecting means for the spade, in the form of respective rollers 13 (Figs. 2 and 3) mounted on the semi-trailer 5 coaxially with the load carrying ramp rollers 4. Thus, as the ramp rollers ride up the tractor ramps 1, the cam lever operating rollers 13 engage and depress their respective cam levers 11. These in turn depress the spade 6 in the brake releasing direction so that its tip is positively held out of the path of the semi-trailer brake plunger 8.

The lengths of the cam levers 11 and the horizontal arms 9 on which they rest are so chosen that, when the load carrying rollers 4 on the semi-trailer fully enter the C-brackets 3 and locate the semi-trailer for coupling to the tractor, the cam lever rollers 13 on the semi-trailer 5 move clear of the forward ends of the cam levers and free both these and the arms 9 to allow the spade to rise into contact with the semi-trailer brake plunger 8, whereafter it can be operated to the full extent necessary for applying the semi-trailer brakes.

The spade 6 is operated from the tractor driver's cab by a cable or rod 14 (Figs. 3 and 4) acting on a lever 15 on the shaft 7. The plunger 8 (Fig. 2) operates the semi-trailer brake linkage 16 through a U-lever 17 which is pinned at its mid-point 18 to the link 16 and has one limb pivoted at 19 on the semi-trailer structure whilst the other limb rests on the head 20 of the plunger 8.

Whilst two horizontal arms 9, two cam levers 11, and two cam lever operating rollers 13 have been described above, it is to be understood that only one of each of these components may be fitted if preferred. Moreover, the rollers 13 may be replaced by shoes if desired, or alternatively the cam levers 11 may be omitted and the free ends of the horizontal arms 9 may be directly engaged by appropriately shaped projections on the underside of the semi-trailer, with or without the interposition of rollers to reduce friction between the relatively slidable parts.

We claim:

1. In a composite vehicle comprising a tractor having a brake control and a semi-trailer adapted to be detachably coupled to and partially supported, when coupled, by ramps on the said tractor, a brake mechanism including a displaceable brake effort transmitting element on the semi-trailer; an operative connection between said element and semi-trailer brakes; a coacting brake-actuating element on the tractor located so as to be automatically engageable with the said brake effort transmitting element on the semi-trailer as the latter is brought into the coupled position on the tractor; an operative connection between said coacting element and the tractor brake control; and deflecting means mounted on the semi-trailer for deflecting the said brake-actuating element on the tractor in the brake-releasing direction during an intermediate stage of the semi-trailer coupling operation and for releasing said element in the fully coupled position of the semi-trailer.

2. In a composite vehicle comprising a tractor and a semi-trailer adapted to be detachably coupled to and partially supported, when coupled, by ramps on the said tractor, a brake mechanism including a reciprocable plunger connected to semi-trailer brakes; a brake actuator displaceably mounted on the tractor and interengageable with said plunger in the fully coupled position of the semi-trailer; and deflecting means on the semi-trailer for co-operating with the said brake actuator on the tractor to deflect same in the brake releasing direction during a stage in the coupling operation when the plunger and the actuator begin to come into their mutually operative positions and for releasing said actuator when the tractor and the semi-trailer are fully coupled.

3. In a composite vehicle comprising a tractor and a semi-trailer adapted to be detachably coupled to and partially supported, when coupled, by ramps on the said tractor, a brake mechanism including a vertically reciprocable plunger connected to semi-trailer brakes; a generally horizontal brake actuator pivoted at one end on the tractor so that the other end underlies the plunger in the fully coupled position of the semi-trailer; and deflecting means on the semi-trailer for co-operating with the said brake actuator on the tractor to deflect same in the brake releasing direction during a stage in the coupling operation when the plunger and the actuator begin to come into their mutually operative positions and for releasing said actuator when the tractor and the semi-trailer are fully coupled.

4. In a composite vehicle comprising a tractor and a semi-trailer adapted to be detachably coupled to and partially supported, when coupled, by ramps on the said tractor, a brake mechanism including a vertically reciprocable plunger on the semi-trailer; an operative connection between said plunger and semi-trailer brakes; a generally horizontally disposed brake actuator spade pivoted at one end on the tractor so that its other end underlies the plunger in contact therewith in the normal coupled condition of the tractor and semi-trailer; a pivot pin locked to said actuator spade; a rearwardly projecting arm locked on said pivot pin; a cam lever pivotally mounted on said tractor rearwardly of the pivot axis of said spade and having its free end overlying the free end of said arm; an operating member located beneath the semi-trailer for engagement, during a coupling operation, with said cam lever prior to engagement of the plunger with the spade and operative to depress said cam lever, said arm and said spade; said operating member moving out of contact with the cam lever as the semi-trailer reaches its fully coupled position in the tractor.

5. Brake mechanism for a tractor and semi-trailer composite vehicle comprising a displaceable brake effort transmitting member for actuating semi-trailer brakes; a coacting brake-actuating element adapted to operatively engage said displaceable member in the fully coupled condition of the tractor and semi-trailer; deflection transmitting means of said tractor for transmitting deflecting movement to said brake-actuating element, deflected down to assume a brake inoperative position; and deflecting means on said semi-trailer for engaging and operating said deflection transmitting means during a semi-trailer coupling operation for deflecting said brake actuating member out of the path of said brake-effort transmitting member until the semi-trailer reaches its fully coupled position.

6. Brake mechanism for a tractor and semi-trailer composite vehicle comprising interengageable coacting brake actuating members on the tractor and the semi-trailer; a rigid arm locked to the brake-actuating member on the tractor; and deflecting means on the semi-trailer for engaging and operating said arm to prevent interengagement of said coacting brake actuating members by deflecting the brake actuating member on the tractor in the brake-releasing direction out of the path of the coacting member on the semi-trailer until the semi-trailer reaches its fully coupled position.

References Cited in the file of this patent
UNITED STATES PATENTS

| 1,660,944 | Winn | Feb. 28, 1928 |
| 1,660,946 | Winn | Feb. 28, 1928 |
| 1,668,276 | Jones | May 1, 1928 |
| 1,944,775 | Winn | Jan. 23, 1934 |